(12) United States Patent
Sabini et al.

(10) Patent No.: US 7,814,787 B2
(45) Date of Patent: Oct. 19, 2010

(54) COMBINED OIL LEVEL OR CONDITION SENSOR AND SIGHT OIL LEVEL GAGE

(75) Inventors: Eugene P. Sabini, Skaneateles, NY (US); Oakley Henyan, Auburn, NY (US); Kenneth Napolitano, Victor, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 97 days.

(21) Appl. No.: 11/525,116

(22) Filed: Sep. 20, 2006

(65) Prior Publication Data
US 2008/0066543 A1   Mar. 20, 2008

(51) Int. Cl.
*G01F 23/26*   (2006.01)
(52) U.S. Cl. .................................... 73/304 C
(58) Field of Classification Search ........... 73/40.9, 73/304 C
See application file for complete search history.

(56) References Cited
U.S. PATENT DOCUMENTS
4,152,937 A    5/1979 Todt et al.
5,540,086 A *  7/1996 Park et al. ............... 73/53.05
5,929,754 A *  7/1999 Park et al. ............... 340/439
6,459,995 B1 * 10/2002 Collister ..................... 702/23
6,520,011 B2   2/2003 Nakamura

* cited by examiner

*Primary Examiner*—Hezron Williams
*Assistant Examiner*—Mark Shabman

(57) ABSTRACT

The invention provides an oil level or condition sensor featuring a housing and a baffle or plate arrangement arranged in the housing, where the baffle or plate arrangement forms a capacitor when the housing is filled with oil, the baffle or plate arrangement being responsive to a signal, for providing an oil level or condition sensor signal containing information about the level or condition of the oil in the housing. The baffle or plate arrangement may include one or more plates or a single or multiple star shaped baffles. The one or more plates or multiple star shaped baffles are spaced apart to form the capacitor. The level or condition of the oil within the baffle or plate arrangement changes the inductance. The single or multiple star shaped baffles each have a small hole in the center which provides a visual indication of the oil level. The housing has a transparent window. The inductance change can be measured and used to send alarms or warnings.

20 Claims, 5 Drawing Sheets

::::

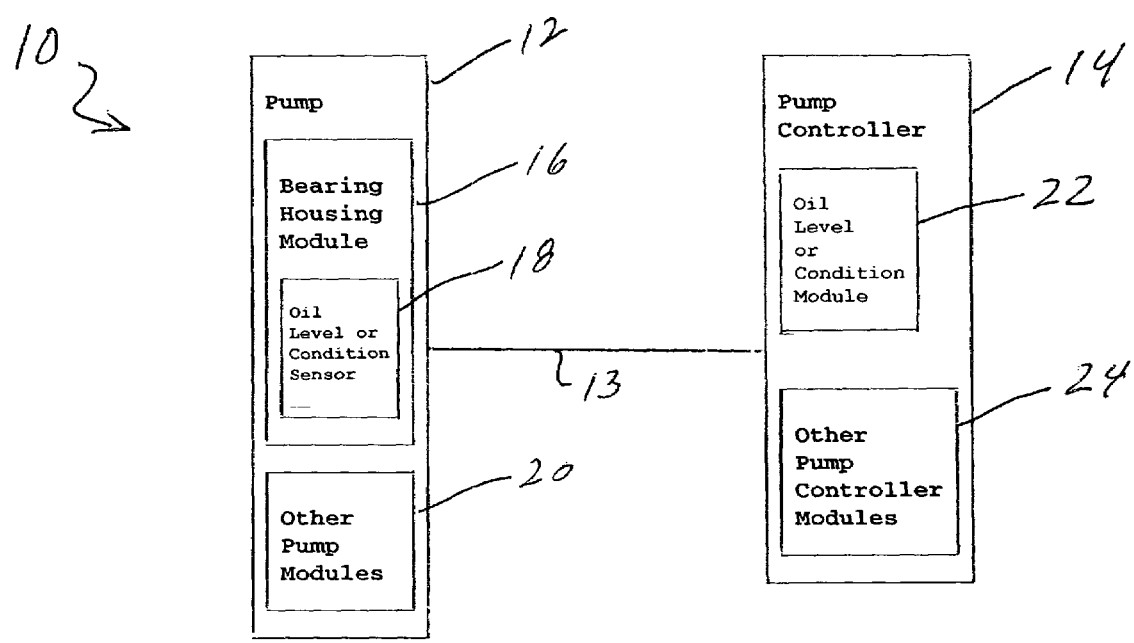
Figure 1: The Basic Pump System

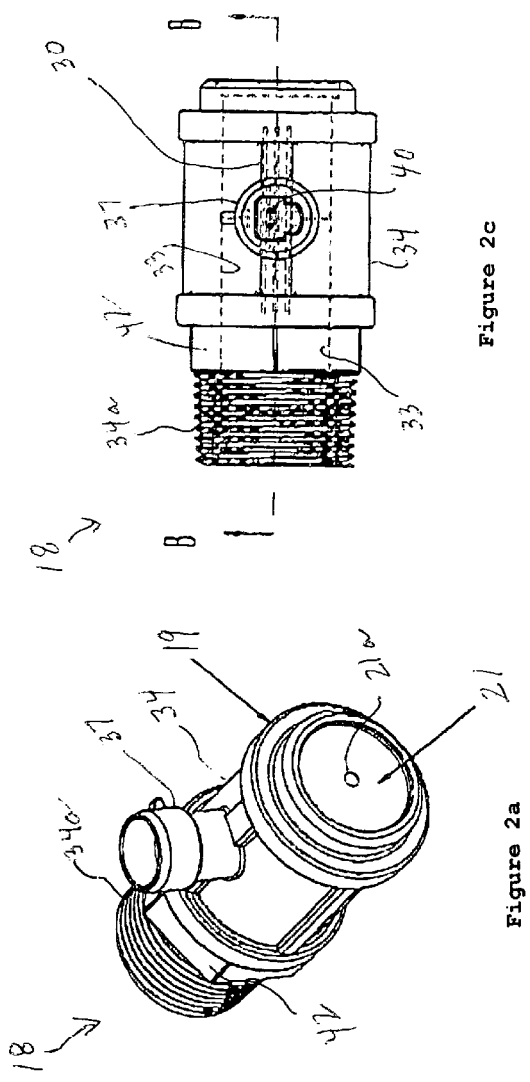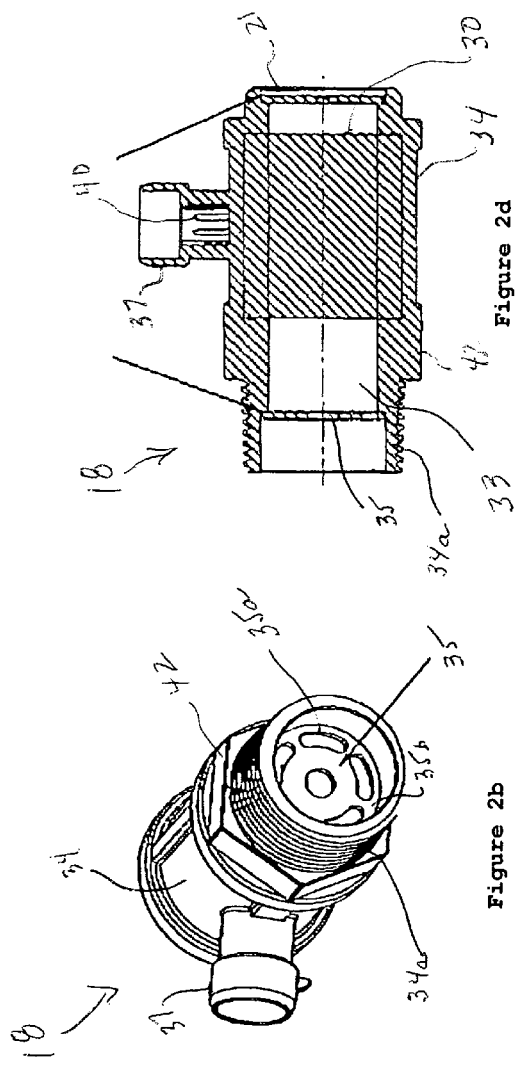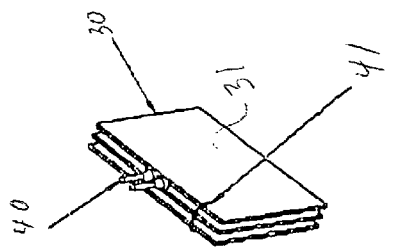

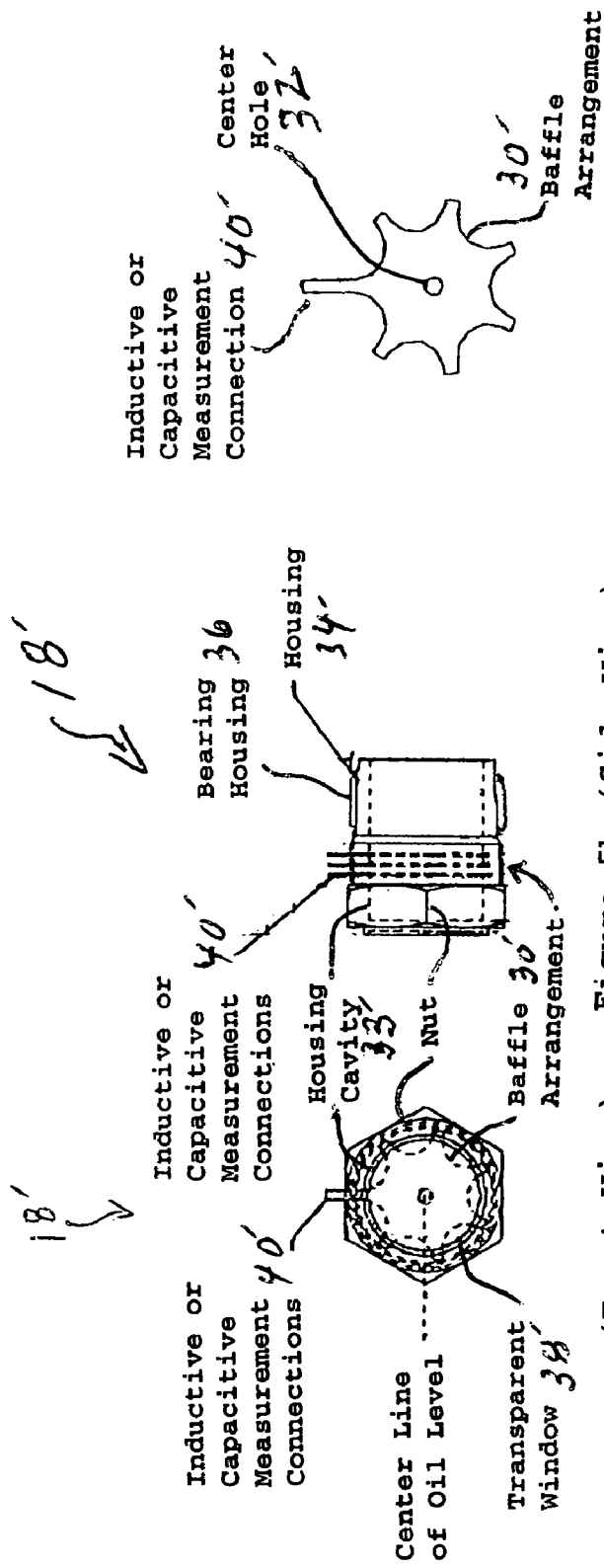
Figure 5: Combined Oil Level sensor and Sight Oil Level Gage

COMBINED OIL LEVEL OR CONDITION SENSOR AND SIGHT OIL LEVEL GAGE

BACKGROUND OF THE INVENTION

1. Technical Field

The present invention generally relates to a sensor or gage; and more particularly to a sensor or gage for a pump forming part of a pumping system.

2. Description of Related Problem

There are several commonly employed techniques to obtain an oil level of a bearing frame or of a rotating piece of equipment:

For example, a known sight glass oil level gage employs a small "star" shaped metal baffle with a hole, stamped or drilled in the center. This baffle is enclosed in a metal or plastic housing which screws into the bearing housing in such a way that the hole in the baffle is centered with the desired center line level of the oil. Outboard of the baffle is a transparent glass or plastic window, which is used to view the oil level. The disadvantage for the sight glass oil level gage is that it requires a person to visually check the oil.

In addition, an inductive or capacitive sensor is typically screwed into the bottom of the bearing housing. The sensor's length is such that it protrudes through the oil. The oil level is inferred by measuring the inductance of the sensor. This type of sensor can be used to automatically annunciate alarms or warnings on low or high oil level, when attached to a personal computer (PC), a supervisory control or data acquisition (SCADA) system or a distributed control system (DCS). The inductive or capacitive sensors must be available in many lengths to accommodate all of the different bearing house designs. To determine the oil level or change in oil level, a reference capacitance must be taken for each housing design. Most times this type of sensor is screwed into the oil drain hole plug connection, which necessitates removing wire, etc. when draining the oil. Otherwise, an extra plug connection on the bottom of the housing is required.

Other known level sensing techniques include that disclosed in U.S. Pat. No. 4,152,937, which provides for a liquid level sensor having a level mutual inductance probe with primary and secondary windings wound coextensively inside a closed end tubular protective housing; as well as that disclosed in U.S. Pat. No. 6,520,011, which provides for a powder detecting capacitive type sensor having a sensor body having a pair of electrodes inside and a circuit that detects a change of capacitance between the electrodes so as to detect the existence of powder adjacent the sensor body, where the sensor is arranged on a wall of a powder tank.

SUMMARY OF THE INVENTION

In its broadest sense, the present invention provides a new and unique oil level or condition sensor featuring a housing and a baffle or plate arrangement arranged in the housing, where the baffle or plate arrangement forms a capacitor when the housing is filled with oil. In operation, the baffle or plate arrangement responds to a signal, for providing an oil level or condition sensor signal containing information about the oil level or condition in the housing.

The baffle or plate arrangement includes one or more plates or a single or multiple star shaped baffles that are substantially geometrically the same so that the inductance is substantially constant when used with lubricating oils. The one or more plates or multiple star shaped baffles are spaced apart to form the capacitor. The level or condition of the oil within the baffle or plate arrangement changes the inductance. The single or multiple star shaped baffles each have a small hole in the center which provides a visual indication of the oil level. The housing has a transparent window. The inductance change can be measured and used to send alarms or warnings. The signal to the baffle or plate arrangement may take the form of an interrogation signal received from an oil level or condition sensor module, or may be a voltage signal received from some power source.

The present invention also provides for a new and unique pump having a bearing housing with the oil level or condition sensor arranged therein, as well as a new and unique pump controller responsive to such an oil level or condition sensor signal, for either controlling the operation of the pump, for providing either an audio or visual warning, or some combination thereof. The present invention also provides a new and unique pump system featuring such an oil level or condition sensor in combination with such a pump controller.

Furthermore, the present invention also provides a new and unique method featuring steps of arranging in a bearing housing of a pump an oil level or condition sensor having a housing with a baffle or plate arrangement therein; forming a capacitor or inductor when the housing is filled with oil; providing a signal to the baffle arrangement; and receiving an oil level or condition sensor signal containing information about the oil level or condition in the housing. The method also features steps of responding to the oil level or condition sensor signal; and either controlling the operation of the pump, or providing either an audio or visual warning, or some combination thereof.

In effect, the present invention overcomes the above shortcomings when attempting to measure oil level or condition. The sensing device according to the present invention screws into the existing sight glass oil level gage connection or constant level oiler connection and provides a sensor which can automatically annunciate alarms or warnings for low or high oil level or a contaminated oil condition. Since the sensing device uses single or multiple baffles, which are geometrically the same, the inductance is constant when used with lubricating oils, therefore the sensing device does not require calibration for each design when attached to a PC, SCADA or DCS system. In addition, if water or other substance contaminates the oil in the sensing device, a capacitance versus time signal being measured and monitored will start to skew indicating a contaminated oil condition.

The foregoing and other objects, features and advantages of the present invention will become more apparent in light of the following detailed description of exemplary embodiments thereof.

BRIEF DESCRIPTION OF THE DRAWING

The drawing is not drawn to scale and includes the following Figures:

FIG. 1 show a diagram of a basic pump system according to the present invention.

FIG. 2 shows diagrams of one embodiment of the present invention in the form of a combined oil level or condition sensor and sight oil level gage, including FIGS. 2a and 2b which show front and side perspective views of the combined oil level or condition sensor and sight oil level gage, FIG. 2c which shows a top view of the combined oil level or condition sensor and sight oil level gage shown in FIG. 2a, FIG. 2d which shows a cross-section view of the combined oil level or condition sensor and sight oil level gage along lines B-B shown in FIG. 2c, and FIG. 2e which shows a plates that forms part of the combined oil level or condition sensor and sight oil level gage shown in FIGS. 4a-4d.

FIG. 5 shows diagrams of another embodiment of the present invention in the form of a combined oil level or condition sensor and sight oil level gage, including FIGS. 5a and 5b which show front and side views of the combined oil level or condition sensor and sight oil level gage, and including FIG. 5c which shows a star shaped baffle that forms part of the combined oil level or condition sensor and sight oil level gage shown in FIGS. 5a and 5b.

BEST MODE FOR CARRYING OUT THE INVENTION

Figure 3:
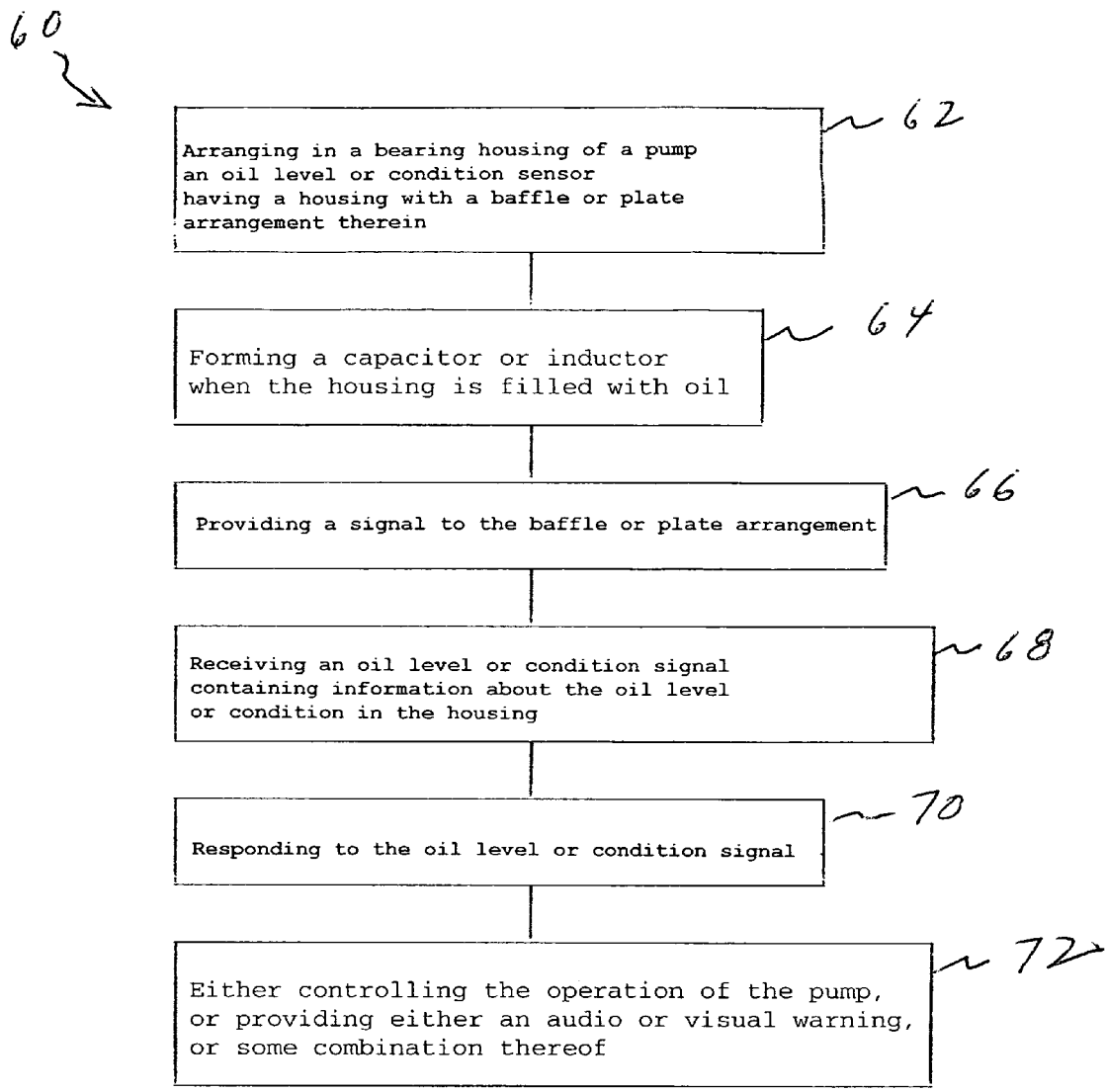
FIG. 3 shows a diagram of a flowchart of basic steps for using the oil level or condition sensor in a pump according to the present invention.

FIG. 1 shows, by way of example, a pumping system or other suitable rotating equipment generally indicated as 10, having a pump or other suitable rotating device 12 coupled to a pump controller 14 via a line 13 that provides data and control signals between the pump 12 and pump controller 14.

The pump 12 includes a bearing housing 16 having an oil level or condition sensor 18 according to the present invention. In operation, consistent with that shown and described herein, the oil level or condition sensor 18 responds to the oil level or condition in the bearing housing, and provides an oil level or condition sensor signal containing information about the oil level or condition being sensed. In one embodiment, the oil level or condition sensor signal may be provided to the pump controller 14 and used for controlling the operation of the pump 12, including either turning the pump 12 off, or for issuing audio or visual alarms or warnings for low or high oil levels or a contaminated oil condition, for example, consistent with that shown and described herein. The scope of the invention is not intended to be limited to how the oil level or condition sensor signal is used, how the oil level or condition sensor signal is used to control the pump 12, or the type or kind of audio or visual alarms or warnings issued.

The pump 12 may also include other pump modules 20 that are known in the art, that do not form part of the present invention, and thus that are not described in detail herein, including but not limited to a power module for powering the pump 12, as well as other modules either now known or later developed in the future. Moreover, the scope of the invention is intended to include the pump controller 14 being a stand alone module, or instead forming part of one or more of such other pump modules 20. In other words, the scope of the invention is not intended to be limited to where the functionality of the pump controller 14 is implemented.

The pump controller 14 includes an oil level or condition sensor module 22 that responds to the oil level or condition sensor signal along the line 13 and processes the same for controlling the operation of the pump 12, for example, including either turning the pump 12 off, or issuing the audio or visual alarms or warnings for low or high oil levels or a contaminated oil condition. Many different types and kind of pump controller and/or monitoring equipment such as 14 for controlling and/or monitoring pumps are known in the art. Based on an understanding of such known modules, a person skilled in the art would be able to implement such an oil level or condition sensor module such as 22 therein to perform functionality consistent with that described herein, including either turning the pump 12 off, or issuing the audio or visual alarms or warnings for low or high oil levels or a contaminated oil condition based on the same by providing a control signal along line 13 to the pump 13, or by providing a data or control signal to an audio module or a display module or some combination that form part of such other pump control modules 24. By way of example, the functionality of such an oil level or condition sensor module 22 may be implemented using hardware, software, firmware, or a combination thereof, although the scope of the invention is not intended to be limited to any particular embodiment thereof. In a typical software implementation, such a module would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology known or later developed in the future. Consistent with that described above, embodiments are envisioned in which the functionality of the oil level or condition sensor module 22 is implemented within one or more of the other pump modules 20.

The Implementation

FIG. 2 shows one embodiment of the oil level or condition sensor 18 in the form of a combined oil level or condition sensor and sight oil level gage that includes an assembly 19 having a baffle or plate arrangement 30 therein. In one embodiment, the assembly 19 may be a molded assembly, although the scope of the invention is not intended to be limited to the same. The baffle or plate assembly 30 may include one or more plates or a single or multiple baffles spaced apart to form a capacitor when filled with oil. In operation, the level or condition of the oil within the baffle or plate arrangement 30 changes the inductance with level. In other words, as the oil level goes up or down, or as the oil condition becomes contaminated, the inductance of the baffle or plate arrangement 30 changes. The inductance change for high or low oil level, or the condition of the oil, or both, can be easily measured in the oil level or condition sensor module 22 and used to send alarms or warnings, for example, for the low or high oil levels or the contaminated oil condition. The method or technique for making such a measurement of oil level or condition are known in the art and may be implemented by a person skilled in the art without undue experimentation based on the description herein. Moreover, the scope of the invention is not intended to be limited to any such method or technique for measuring the same either now know or later developed in the future.

The baffle or plate arrangement 30 is arranged or positioned in a cavity 33 (FIG. 2d) of a housing 34 of the assembly 19 that screws into a bearing housing 36 (not shown in FIG. 2, but see FIG. 5b) of the bearing housing module 16 (FIG. 1). In operation, the baffle or plate arrangement 30 forms a capacitor when the housing 34 is filled with oil; and the baffle or plate arrangement 30 responds to a signal, for providing the oil level or condition sensor signal containing information about the oil level or condition in the housing 34. The signal may take the form of an interrogation signal received from the oil level or condition sensor module 22, or may be a voltage signal received from some power source that, for example, may form part of the one or more other pump modules 20. The scope of the invention is not intended to be limited to the type or kind of signal being sent to the baffle or plate arrangement 30 for inducing the oil level or condition sensor signal according to the present invention.

The housing 34 may be screwed by threads 34a into an existing sight glass oil hole (not shown) or constant level oiler hole (not shown) in known bearing housings. The baffle or plate arrangement 30 has one or more inductive or capacitive measurement connections 40 available to allow easy measurement of inductance, which may be used to trigger the alarm or warning. As best shown in FIGS. 2c and 2d, the one or more inductive or capacitive measurement connections 40 are arranged in and protected by a terminal housing 37 protruding from the housing 34. By way of example, in operation wiring from the pump controller 14 may be coupled to the connections 40 and frictionally engaged in the terminal housing 37 to hold the same in place, although the scope of the invention is not intended to be limited to any particular coupling or connection between the same. In one embodiment, the combined oil level or condition sensor and sight oil level gage 18 may also include a nut-shaped portion 42 shaped in the form of a hexagon to enable the maintenance worker to screw the gage 18 into the bearing housing. The dimensions of the gage 18 according to the present invention may be sized to accommodate any bearing housing connection having U.S. or metric measurements, and the scope of the invention is not intended to be limited to any particular dimensions thereof.

The oil level or condition sensor 18 may include a bulls eye lens 21 having a small hole or marking 21a in the center, which gives a visual indication of oil level. The hole or marking 21a in the bulls eye lens 21 is centered at the desired oil level. The bulls eye lens 21 may either be positioned behind a transparent window (not shown) or may be a separate transparent structure, for example, with a colored marking therein. This arrangement enables, for example, a maintenance worker to have a visual indication of the oil level in the bearing housing, including when manually pouring oil into the bearing housing of the bearing housing module 16 (FIG. 1).

The oil level or condition sensor 18 may also include, for example, a splash guard 35 having openings 35a arranged in the housing 34. The openings 35a allow oil from the bearing housing to enter the housing 34 of the sensor 18, while the surrounding structure indicated as 35b functions to minimize the turbulence of the oil in the housing 34. The structural configuration of the splash guard 35 is shown by way of example, and embodiment are envisioned having other types of structural configuration, including but not limited to a different number, size or shape of the openings 35a.

FIG. 2e shows one embodiment of the baffle or plate arrangement 30 in the form of parallel rectangular plates according to the present invention. By way of example, the baffles or plate arrangement 30 is shown having three parallel plates, an inductive or capacitive measurement connection 40 and a shorting wire 41. The scope of the invention is not intended to be limited to the size, shape, type, material or number of plates 31. For example, embodiments of the present invention are envisioned using different sized plates 31, different shaped plates 31, a different type of plates 31, or a different number of plates 31. The scope of the invention is not intended to be limited to the materials used for the plates 31. The shorting wires 41 may be helpful in the overall measurement of the capacitance or inductance, although the scope of the invention is not intended to be limited to the use of the same.

FIG. 3

FIG. 3 shows a flowchart generally indicated as 60 of a method for using the oil level or condition sensor according to the present invention, featuring a step 62 of arranging in a bearing housing 36 (FIG. 2) of a pump 12 (FIG. 1) an oil level or condition sensor 18 (FIGS. 1 and 2) having a housing 34 (FIG. 2) with a baffle arrangement 30 (FIG. 2) therein; a step 64 of forming a capacitor or inductor when the housing 34 is filled with oil; a step 66 of providing a signal to the baffle arrangement 30; and a step 68 of receiving an oil level or condition sensor signal containing information about the oil level or condition in the housing 34. The method also features a step 70 of responding to the oil level or condition sensor signal; and a step 72 of either controlling the operation of the pump, or providing either an audio or visual warning, or some combination thereof.

FIG. 4

Figure 4:
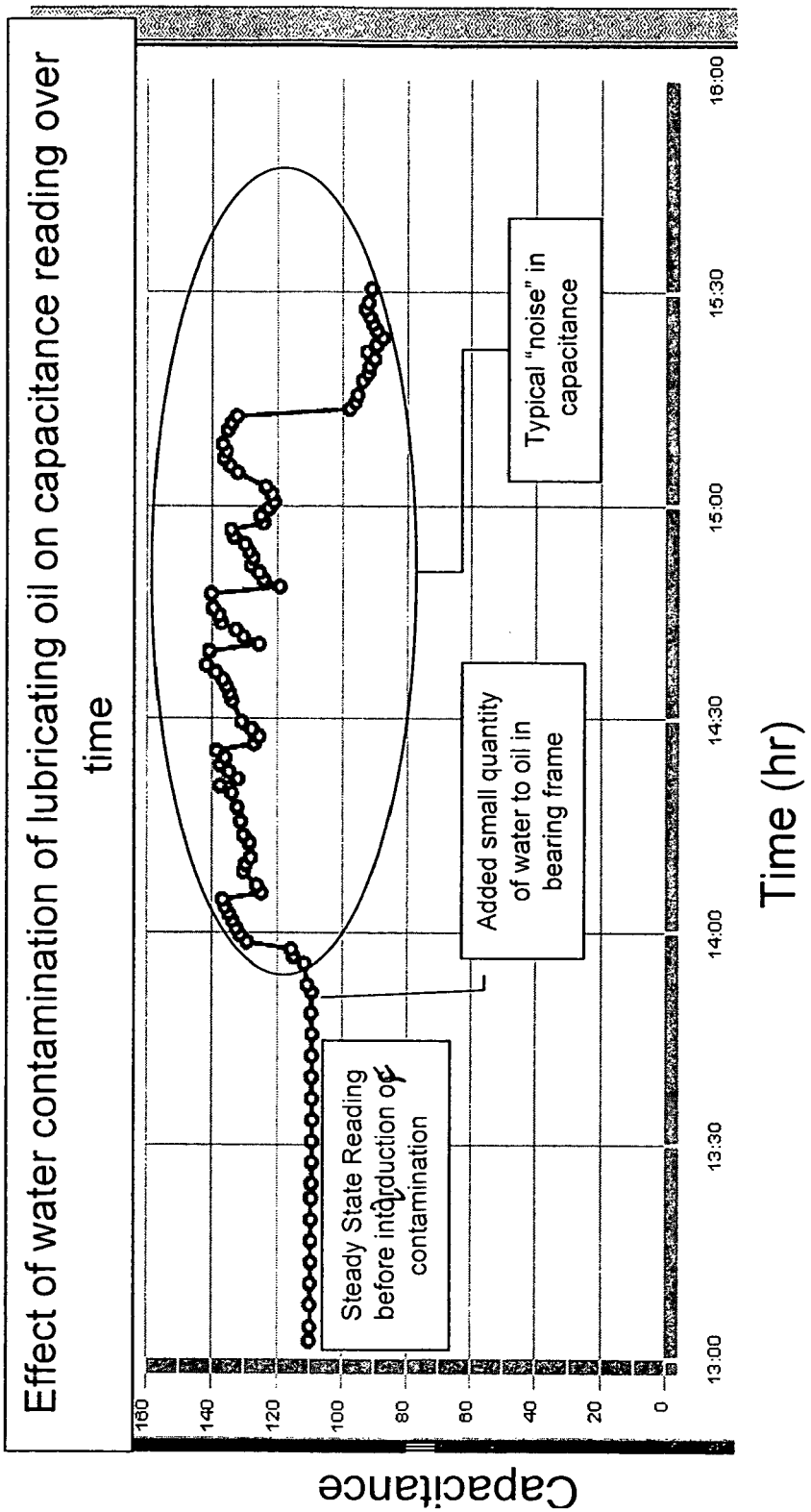
FIG. 4 shows a typical graph of capacitance versus time (hrs.) indicating the effect of water contamination of lubricating oil on a capacitance reading over time according to the present invention.

FIG. 4 shows a graph of capacitance versus time (hrs.) indicating the effect of water contamination of lubricating oil on a capacitance reading over time according to the present invention. As shown, the graph has a steady state reading before the introduction of contamination (e.g. water); around t=about 13:50 the graph shows a small quantity of water added to oil in the bearing frame; and between the interval t=about 14:00 through 15:30 the graph shows typical "noise" in capacitance that would be sensed by the oil level or condition sensor module 22.

FIG. 5: Alternative Embodiment

FIG. 5, includes FIGS. 5a and 5b, shows one embodiment of the oil level or condition sensor 18 in the form of a combined oil level or condition sensor and sight oil level gage 18' that uses a baffle or plate arrangement 30' having single or multiple "star" shaped baffles spaced apart to form a capacitor when filled with oil. In operation, the depth of the oil within the baffles 30' changes the inductance with level. In addition, these baffles 30' have a small hole 32' in the center, which gives a visual indication of oil level. As the oil level goes up or down, the inductance of the "star" shaped baffles 30' changes. The inductance change for high or low oil level or oil condition can be easily measured in the oil level or condition sensor module 22 and used to send alarms or warnings, for example, for the low or high oil levels or a contaminated oil condition.

The baffles 30' are arranged or positioned in a cavity 33' of a housing 34' that screws into the bearing housing 36 of the bearing housing module 16 (FIG. 1). In operation, the baffle arrangement 30' forms a capacitor when the housing 34' is filled with oil; and the baffle arrangement responds to a signal, for providing the oil level or condition sensor signal containing information about the oil level or condition in the housing 34'. The signal may take the form of an interrogation signal received from the oil level or condition sensor module 22, or may be a voltage signal received from some power source that, for example, may form part of the one or more other pump modules 20. The scope of the invention is not intended to be limited to the type or kind of signal being sent to the baffle arrangement 30' for inducing the oil level or condition sensor signal according to the present invention.

In one embodiment, the housing 34' may be screwed into an existing sight glass oil hole or constant level oiler hole in known bearing housings. The one or more holes 32' in the baffles 30' are centered at the desired oil level and positioned behind a transparent window indicated by reference numeral 38'. This enables, for example, a maintenance worker to have a visual indication of the oil level in the bearing housing 36, including when manually pouring oil into the bearing housing 36 of the bearing housing module 16 (FIG. 1). The baffles 30' have one or more inductive or capacitive measurement connections 40' available to allow easy measurement of inductance, which may be used to trigger the alarm or warning. In one embodiment, the combined oil level or condition sensor and sight oil level gage 18' may include threads (not shown) and a nut 42' shaped in the form of a hexagon to enable the maintenance worker to screw the gage 18' into the bearing housing 36. The dimensions of the gage 18' according to the present invention may be sized to accommodate any bearing housing connection having U.S. or metric measurements, and the scope of the invention is not intended to be limited to any particular dimensions thereof.

FIG. 5c shows one embodiment of the baffle arrangement 30' in the form of a star shaped baffle according to the present invention. By way of example, the "star" shaped baffles 30' is shown having six points and an inductive or capacitive measurement connection 40' for operating alone or in conjunction with one or more other star shaped baffles consistent with that shown and described herein. The scope of the invention is not intended to be limited to the number or type of points on the "star" shaped baffles 30'. For example, embodiments of the present invention are envisioned using star baffles having another different shape or another different number of points, such as two points, three points, four points, five, seven points, etc. Furthermore, the scope of the invention is not intended to be limited to the particular shape of the baffle, and is intended to include baffles having other shapes either now known or later developed in the future.

Other Applications

The present invention may used in relation to other pieces of lubricated rotating equipment such as gear boxes, fans, motors, compressors, crushers, virtually any piece of rotating equipment. It eliminates the need for the additional machining to accommodate the oil level or condition sensor. The oil level or condition sensor can be used on all of the lubricated rotating equipment, as it easily replaces existing sight level gages or constant level oilers.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A method comprising:
    arranging in a bearing housing of a pump an oil level or condition sensor having a housing with a baffle or plate arrangement therein, the baffle or plate arrangement being configured with parallel baffles or plates arranged in a cavity of the housing and spaced apart to form a single capacitor or inductor when the housing is filled with oil;
    providing at different instances of time a signal to the oil level or condition sensor, and receiving in a pump controller an oil level or condition sensor signal containing information about a capacitance or inductance of the parallel baffles or plates of the single capacitor or inductor; and
    determining in the pump controller the oil level or condition based on a change in measurements of the capacitance or inductance of the parallel baffles or plates of the single capacitor or inductor at the different instances of time.

2. A method according to claim 1, wherein the two or more baffles or plates include multiple star shaped baffles having multiple points.

3. A method according to claim 2, wherein the two or more baffles or plates comprise three star shaped baffles.

4. A method according to claim 2, wherein the two or more baffles or plates comprise multiple star shaped baffles that are substantially geometrically the same so that the inductance or capacitance is substantially constant when used with lubricating oils.

5. A method according to claim 1, wherein the level or condition of the oil within the baffle or plate arrangement changes the inductance or capacitance of the single capacitor or inductor.

6. A method according to claim 1, wherein the baffle or plate arrangement includes multiple star shaped baffles, each having have a small hole in the center which provides a visual indication of the oil level.

7. A method according to claim 1, wherein the housing has a transparent window for viewing the level of the oil.

8. A method according to claim 1, wherein the inductance or capacitance change can be measured and used to send alarms or warnings.

9. A method according to claim 1, wherein the method comprises:
    either controlling the operation of the pump, or providing either an audio or visual warning, or some combination thereof.

10. A method according to claim 1, wherein the method comprises:
    measuring and monitoring a capacitance/inductance versus time signal in order to determine if the oil condition has changed based on a skewing in the capacitance/inductance versus time signal away from a steady state reading.

11. A method comprising:
    providing signaling at different instances of time to an oil level or condition sensor that is configured with a housing having a baffle or plate arrangement, the baffle or plate arrangement being configured with parallel baffles or plates arranged in a cavity of the housing and spaced apart so as to form a single capacitor or inductor when the housing is filled with oil and that is also configured in a bearing housing of a pump; and
    receiving corresponding signaling from the parallel baffles or plates of the oil level or condition sensor containing information about a capacitance or inductance of the single capacitor or inductor; and
    determining the oil level or condition based on a change in measurements of the capacitance or inductance of the parallel baffles or plates of the single capacitor or inductor at the different instances of time.

12. A method according to claim 11, wherein the two or more baffles or plates comprises multiple star shaped baffles having multiple points.

13. A method according to claim 12, wherein the method includes arranging the oil level or condition sensor in the bearing housing of the pump.

14. A method according to claim 12, wherein the two or more baffles or plates comprise multiple star shaped baffles that are either substantially geometrically the same so that the inductance or capacitance is substantially constant when used with lubricating oils.

15. A method according to claim 11, wherein the level or condition of the oil within the baffle or plate arrangement changes the inductance or capacitance of the single capacitor or inductor.

16. A method according to claim 11, wherein the two or more baffles or plates includes multiple star shaped baffles, each having have a small hole in the center which provides a visual indication of the oil level.

17. A method according to claim 11, wherein the housing has a transparent window for viewing the level of the oil.

18. A method according to claim 11, wherein the inductance or capacitance change can be measured and used to send alarms or warnings.

19. A method according to claim 11, wherein the method comprises:
  either controlling the operation of the pump, or providing either an audio or visual warning, or some combination thereof.

20. A method according to claim 11, wherein the method comprises:
  measuring and monitoring a capacitance/inductance versus time signal in order to determine if the oil condition has changed based on a skewing in the capacitance/inductance versus time signal away from a steady state reading.

* * * * *